H. PEASE.
HARVESTER RAKE.

No. 110,279.  Patented Dec. 20, 1870.

Witnesses.  Henry Pease
Alex Mahon  by his Attorney
H. H. Doubleday  A. M. Smith

United States Patent Office.

HENRY PEASE, OF BROCKPORT, NEW YORK, ASSIGNOR TO HIMSELF AND HENRY W. SEYMOUR, OF SAME PLACE.

Letters Patent No. 110,279, dated December 20, 1870.

---

IMPROVEMENT IN HARVESTER-RAKES.

---

The Schedule referred to in these Letters Patent and making part of the same.

---

*To all whom it may concern:*

Be it known that I, HENRY PEASE, of Brockport, county of Monroe, State of New York, have invented certain new and useful Improvements in Harvester-Rakes, of which the following is a full, clear, and exact description, reference being had to the accompanying drawing making a part of this specification, in which—

Similar letters of reference denote corresponding parts in all the figures.

Figure 1:
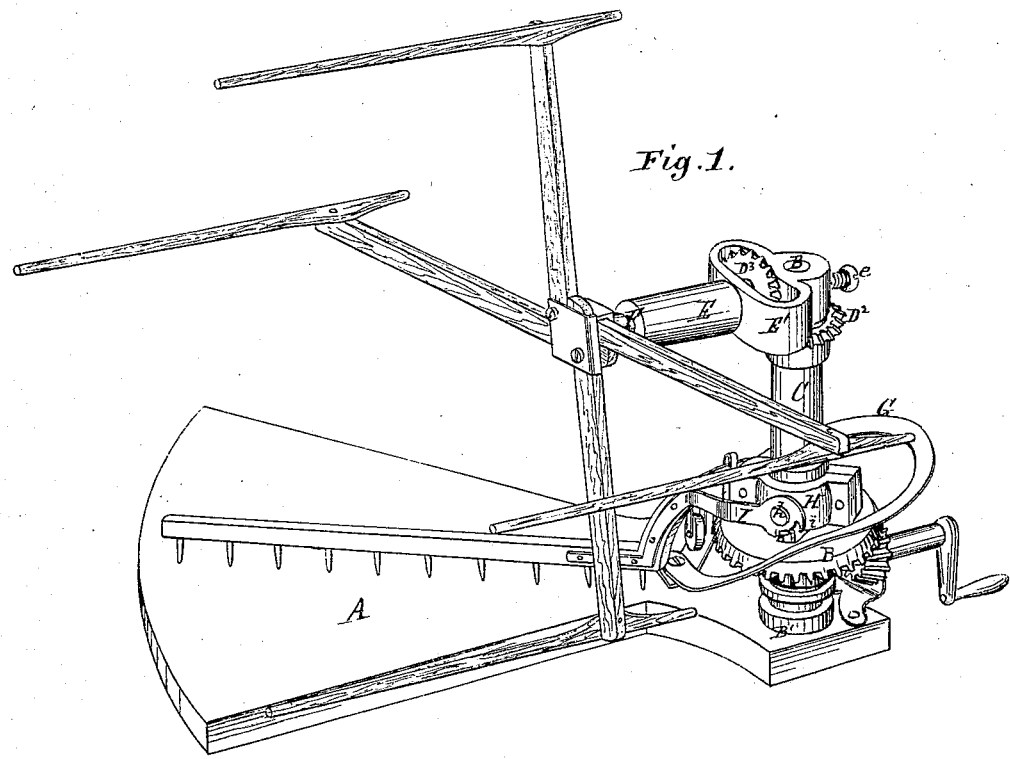
Figure 1 is a perspective view of a harvester platform with my improvements applied.
Figures 2, 3:
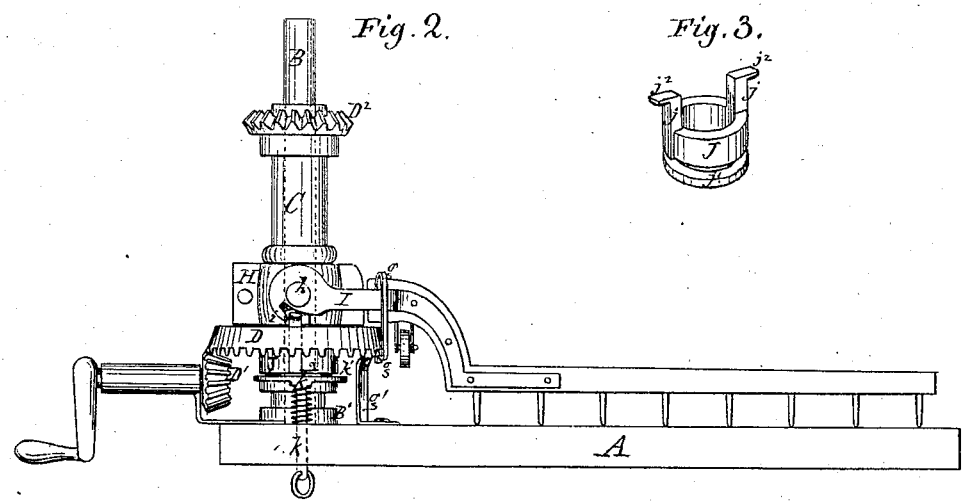
Figure 2 is a rear elevation of the same with the reel removed.
Figure 3 is a perspective view of the rake-shipping device, detached.

My invention relates to that class of machines which employs an overhung reel, and in connection therewith a continuously-rotating rake, which strikes into the standing grain in front of the cutters and assists the reel-beaters in picking up the grain and presenting the same to the cutters, after which it passes underneath the reel-shaft and sweeps over the platform in the arc of a horizontal circle, for discharging the grain behind the main frame and out of the way of the team and machine on the succeeding round; and It consists—

First, mounting the horizontal reel-shaft in an adjustable yoke, which is supported upon a stationary reel-post, the rake being driven from a sleeve surrounding reel-post, in such manner that, by vertically adjusting the yoke upon the post and changing the size of the bevel-wheel upon the reel-shaft, the speed of the reel may be changed; and I may, also, by swinging the yoke horizontally upon the post, change the vertical plane occupied by the reel, for the purpose of adjusting its angle of relation to the cutting apparatus.

Second, in the construction and arrangement of the clutch or shipping device, for controlling the rake and making it independent of the reel.

Third, in combining with the rake-arm a hook (or hooks) which engages with the shipping device while the rake is traversing the cam-guide on its return movement, and prevents the rake from being accidentally thrown out of gear and from becoming caught by and entangled with the reel.

Fourth, in locking the rake-arm to and carrying it upon the face of the gear-wheel while the rake is sweeping the platform.

Fifth, in an arrangement of spring catch for holding the rake down upon the platform while sweeping over the same, in combination with a tripping device for releasing the rake and allowing it to rise after the grain is discharged.

In the accompanying drawing—

A represents the platform, which is made and applied in rear of the cutting apparatus in any usual manner.

B is the reel-post, mounted upon the inner front corner of the platform, or upon the main-frame shoe or finger-bar, or an extension thereof; and B', the base-plate or flange, by means of which the post B is rigidly attached to the bar or other support, said plate B' also serving as the step or support for the gear-sleeve C, mounted on shaft or post B.

Sleeve C has keyed to it, near its lower end, a bevel-wheel, D, through which motion is imparted to the sleeve from a bevel-wheel, $D^1$, driven from the main driving-wheel or axle of the machine in any usual manner.

On the upper end of post B is mounted a tubular arm or yoke, E, expanded in width and slotted, at E', to accommodate a bevel-pinion, $D^3$, on the inner end of the reel-shaft F, which is mounted in the sleeve of yoke E, and to which motion is imparted, through bevel-pinion $D^3$, from a bevel-wheel, $D^2$, on the upper end of gear-sleeve C.

The arm or yoke E may be set and held at the proper height, and with the reel-shaft and beaters at any desired angle to the path of the machine, by means of a set-screw, *e*.

G is an inclined cam-way or track surrounding the post B; and

H is a box or hub mounted loosely on the gear-sleeve C, above the bevel-wheel D, said box being provided with pivots or trunnions, *h*, on its opposite sides, upon which the rake-arm or straps I are hung in such manner as to be free to vibrate to provide for the necessary vertical movements of the rake.

J is a tubular clutch or shipper surrounding the lower end of gear-sleeve C, and provided with upright arm or hooks, *j*, which pass through slots or perforations in the bevel-wheel D, and enter notches in the lower face of box H, underneath the rake-pivots *h*, said arms engaging with the bevel-wheel and causing the clutch to be rotated therewith, and also serving, when engaged with the box H, to rotate said box and the rake carried thereby.

The shipper-sleeve J is grooved at $j^1$, and a forked or crescent-shaped flange, $k^1$, on the upper end of a vertical slide-rod, *k*, engaging in the groove $j^1$, serves, when slide-rod *k* is moved up or down, to engage or disengage arms *j* with the box or rake-carrier H.

A spring, $k^2$, surrounding slide-rod *k*, serves to hold the slide up, with the clutch engaged with the rake-carrier or box H.

The lower end of slide *k* may be connected with any suitable arrangement of hand-lever or treadle, placed in convenient position to be operated by the hand or foot of the driver riding on the machine.

The upper ends of shipper-arms or uprights *j* are ovided with horizontal ears or hooks, $j^2$, and the ke-arms or straps I are provided, at their heel or vot end, with hooks, $i$, which, when the rake is raised a certain height on its return or backward movement, pass underneath the hooks $j^2$, and thereby prevent the rake from being accidentally thrown out of ear, and insure its approach to the reel in its descent into the standing grain in uniform relation to the reel-beaters.

The cam-way or track G drops out of the path of the rake-arm, or, if preferred, it may be left open on the side adjacent to the platform, so that, after the rake reaches the platform, the rake-arm, instead of resting upon the cam, will rest upon and be carried by the bevel-wheel D, thereby preventing any stopping or back action of the rake in the event of its being thrown out of gear, either accidentally or otherwise, during its passage over the platform.

$g$ is a spring-latch attached to the rake-arm, and serving, by catching underneath the wheel D when the rake-arm rests thereon, to lock the rake-arm to the wheel, and thereby to insure the movement of the rake-arm with the wheel.

$g'$ is an upright standard or tripper, provided at its upper end with an inclined face, against which the lower end of the spring-latch $g$ presses after the rake has passed over the platform, in such manner as to release the latch and allow the rake to rise upon the cam for its return movement.

The operation of the several parts will be readily understood from the foregoing description.

The relative speed of the reel and rake will be governed by the relative size of the bevel-wheel $D^2$ on the upper end of the rake and gear-sleeve, and the bevel-pinion $D^3$ on the reel-shaft; and by substituting gears of varying diameters the reel may be made to make one or two (more or less) revolutions to one of the rake, as desired, and the speed of the rake will be governed by the relative size of gears $D\ D^1$, subject to the control of the driver through the shipping devices described.

Having now described my invention,

What I claim as new, and desire to secure by Letters Patent, is—

1. The adjustable yoke E, supporting the reel, in combination with the stationary reel-post B, tubular sleeve C, and driving-gears $D^2\ D^3$.

2. In combination with the wheel D and rake-carrier H, the tubular clutch J provided with arms $j$, which serve to connect the rake with the bevel-wheel and sleeve, substantially as set forth.

3. The hooks $i$ on the rake-arm, in combination with the ears or hooks $j^2$ on the shipping-clutch, for preventing the rake from being thrown out of gear in its backward or return movement, as described.

4. The spring-catch $g$, in combination with the rake-arm I and carrying-wheel D, for locking the rake-arm down during its passage over the platform, as described.

5. The tripping-standard $g'$, in combination with the spring-catch $g$, arranged and operating substantially as described.

HENRY PEASE.

Witnesses:
M. A. MADDA,
E. D. MARTIN.